United States Patent [19]
Thompson et al.

[11] Patent Number: 6,059,340
[45] Date of Patent: May 9, 2000

[54] ELECTRICALLY MOVEABLE WINDOW ASSEMBLY AND CONTROL MEANS FOR A MOTOR VEHICLE

[75] Inventors: James Thompson, Nuneaton; David Charles Fawdrey, Kidlington; Sarah Goodhew, Kenilworth, all of United Kingdom

[73] Assignee: Rover Group Limited, Warwick, United Kingdom

[21] Appl. No.: 08/945,096

[22] PCT Filed: Mar. 25, 1996

[86] PCT No.: PCT/GB96/00695

§ 371 Date: Sep. 4, 1998

§ 102(e) Date: Sep. 4, 1998

[87] PCT Pub. No.: WO96/32295

PCT Pub. Date: Oct. 17, 1996

[30] Foreign Application Priority Data

Apr. 13, 1995 [GB] United Kingdom .................. 9507727

[51] Int. Cl.[7] .................................................. B62D 27/06
[52] U.S. Cl. ................. 296/26.04; 296/35.3; 296/106; 296/146.8
[58] Field of Search ................ 296/10, 26.04, 296/26.09, 50, 57.1, 106, 35.3, 146.8

[56] References Cited

U.S. PATENT DOCUMENTS

| 3,004,757 | 10/1961 | Lohr ................................ 296/57.1 X |
| 4,729,592 | 3/1988 | Tuchiya et al. ........................ 296/116 |
| 5,570,923 | 11/1996 | Taylor ................................... 296/164 |

FOREIGN PATENT DOCUMENTS

| 0 550 952 | 7/1993 | European Pat. Off. . |
| 2 699 868 | 7/1994 | France . |
| 36 39 377 | 5/1987 | Germany . |

OTHER PUBLICATIONS

ATZ, vol. 91, No. 6, Jun. 1991, Stuttgart, DE, pp. 313–318, XP000082928, Huber et al; "Der Neue Mercedes—Roadster—Karosserie; Klimatisierung, Verdeck und Schliessung" see p. 313, column 1, line 58–p. 315, column 1, line 25; figures 5, 6, 8, 9.

*Primary Examiner*—Dennis H. Pedder
*Attorney, Agent, or Firm*—Davis and Bujold

[57] ABSTRACT

An electrically moveable window assembly and control mechanism for a motor vehicle is disclosed in which when a detachable rear roof section is removed or a retractable rear roof section is folded a frameless window supported by a rear door of the motor vehicle is automatically retracted into the door to prevent it becoming damaged.

28 Claims, 4 Drawing Sheets

ELECTRICALLY MOVEABLE WINDOW ASSEMBLY AND CONTROL MEANS FOR A MOTOR VEHICLE

This invention relates to motor vehicles having a removable or retractable rear roof section and in particular to an electrically movable rear window assembly and control means for such a motor vehicle.

According to the invention there is provided a motor vehicle having a removable or retractable rear roof section, a roof sensor means to sense the removal or retraction of the rear roof section and a number of doors including a rear door supporting a frameless electrically actuated rear window, the rear window being movable by an electric motor in response to a signal received from an electronic controller between a closed position in which the upper edge of the rear window is engaged with an upper door seal attached to the rear roof section and an open position in which the rear window is fully retracted into the lower part of the rear door wherein when the rear roof section is removed or retracted the roof sensor means sends a signal to the electronic controller to cause the electric motor to move the rear window to said open position.

This has the advantage that whenever the roof is removed the rear window is always retracted thereby protecting the rear window.

The roof sensor means may be associated with securing means used to secure the removable rear roof section in position or with securing means used to secure the retractable rear roof section in an erect position.

The window may be maintained in said open position so long as the sensor means indicates that the rear roof section is not in position.

The rear door may be fitted with a sensor to sense whether the rear door is open or closed and if the signal from the sensor indicates that the rear door is open the rear window is prevented from moving into a closed or up position.

The rear window may be fitted with an electric screen heater which is isolated before the rear window is allowed to move into an open position.

The rear window may be fitted with an electrically actuated window wiper which is moved into a parked position before the rear window is allowed to move into an open position.

Preferably the wiper is parked off of the window before the window is moved into a fully open position.

The invention will now be described by way of example with reference to the accompanying drawing of which:

Figure 1:
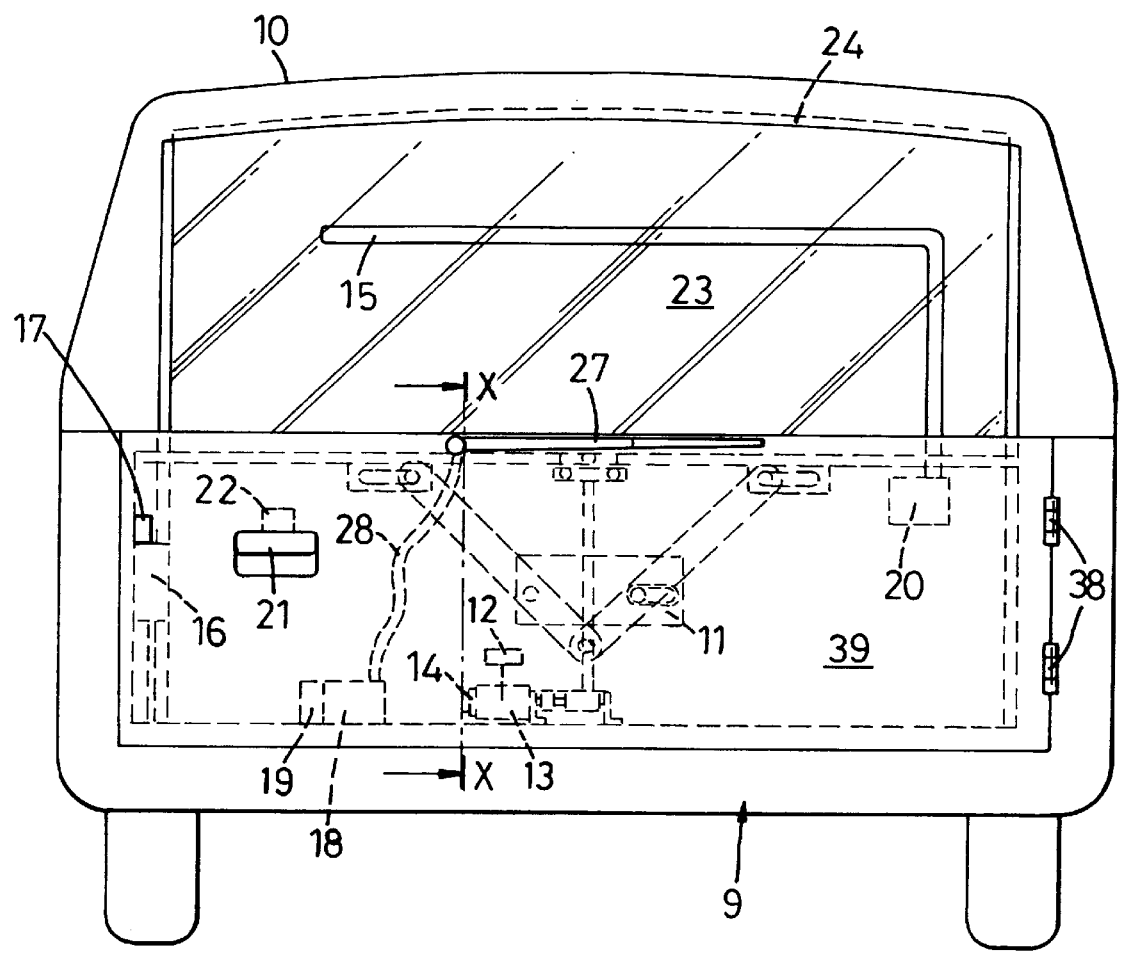
FIG. 1 is a rear view of a motor vehicle including an electrically moveable rear window assembly according to the invention.

With reference to FIGS. 1 to 5 there is shown a motor vehicle having a rear body structure 9 to which is releasably secured by securing means 25 a detachable rear roof section 10.

A rear door 39 is pivotally connected to the rear body structure 9 of the motor vehicle by means of a pair spaced apart hinges 38 and is securable in a closed position by means of an electrically operated locking means 16 attached to part of the structure of the rear door 39.

An operator controllable door release in the form of a door handle 21 is connected to an associated microswitch 22 to provide an open door signal to an electronic controller 11.

Upon receipt of a door open request from the microswitch 22 the electronic controller 11 sends a control signal to the electrically operated locking means 16 to unlatch the door.

The electronic controller 11 is also connected to and receives inputs from a door position sensor 17 used to sense whether the rear door 39 is open or closed, a roof sensor 26 used to sense whether the removable roof section 10 is in place or removed and a window position sensor 14 used to sense the position of a moveable window pane 23.

Figure 2:
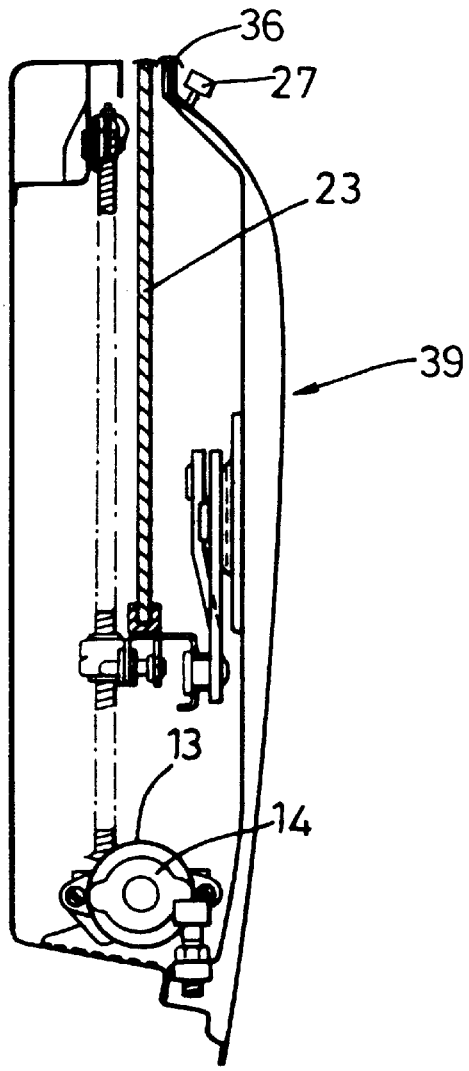
FIG. 2 is a cross section on the line X—X on FIG. 1.

The window 23 is slidingly supported by the rear door 39 and is moveable from a fully closed position, as shown in FIG. 1, in which it is engaged at its upper edge with a 'U', shaped roof seal 24 to a fully open position, as shown in FIG. 2, in which the window 23 is fully retracted into the lower part of the rear door 39 by means of a window lift motor 13 in response to a control signal from the electronic controller 11 to a window lift motor controller 12.

The window 23 is fitted with a heating element 15 which is connected to the electronic controller 11 by means of a rear screen heater controller 20 which in this case is a electric relay.

A rear screen wiper 27 is connected to a wiper motor 18 by means of a flexible drive 28 and is moveable from an off-screen parked position, as shown in FIGS. 1 and 2, to an on screen wiping mode by means of the motor 18 in response to a signal received from a wiper motor controller 19. The wiper motor controller 19 is connected to and receives control signals from the electronic controller 11.

Figure 3:
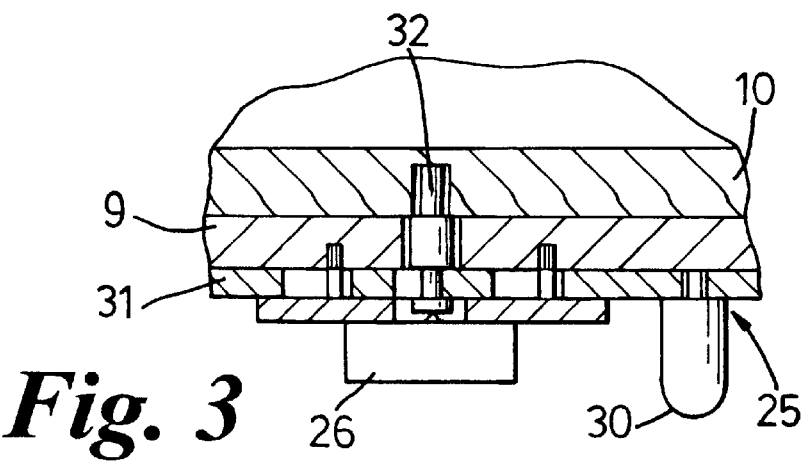
FIG. 3 is a cross section through a roof securing means forming part of the invention.
Figure 4:
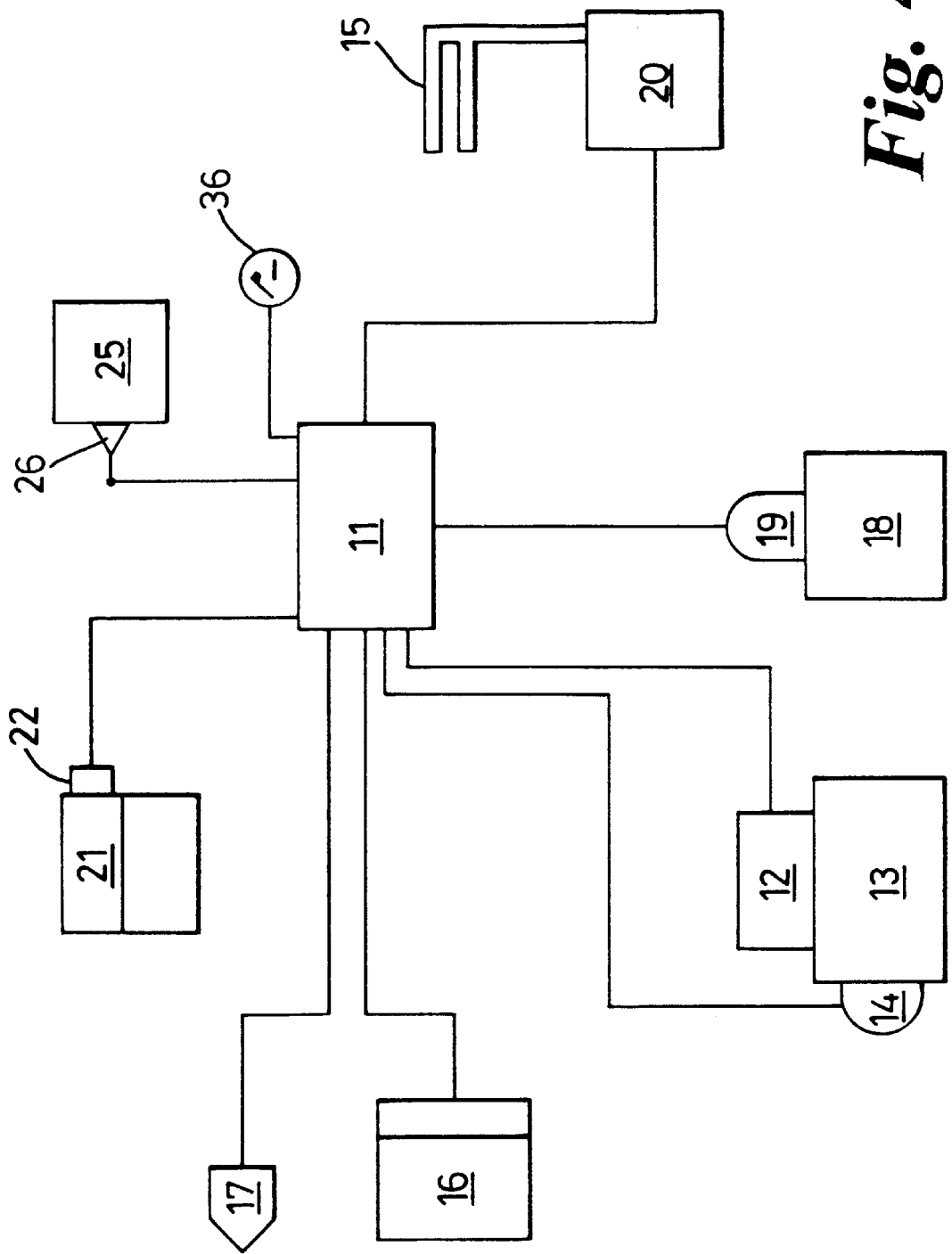
FIG. 4 is a block diagram of an electronic control circuit according to the invention.

The detachable rear roof section 10 is normally held in place by a number of roof securing means 25 of which one is shown in FIG. 3. Each of the roof securing means is fitted to the rear body structure 9 of the motor vehicle and comprises of a slideable plate member 31 having a slot therein into which a recessed peg 32 attached to part of the structure of the detachable roof section 10 is engagable.

The plate 31 is moveable by means of a knob 30 from a locking position, as shown in FIG. 3, in which the peg 32 is prevented from becoming disengaged from the plate 31 by means of engagement of the plate 31 with the recess in the peg 32 to a second position in which the peg is able to move freely through the slot in the plate 31.

A roof sensor in the form of a microswitch 26 is associated with each securing means 25 and is positioned so as to sense the presence of the peg 32 in the plate 31. When the peg 32 is withdrawn from the plate 31, which corresponds to the removal of the rear roof section 10 from the rear body structure 9, the microswitch 26 is actuated and sends a signal to the electronic controller 11 indicating that the detachable roof section 10 has been removed.

Figure 5:
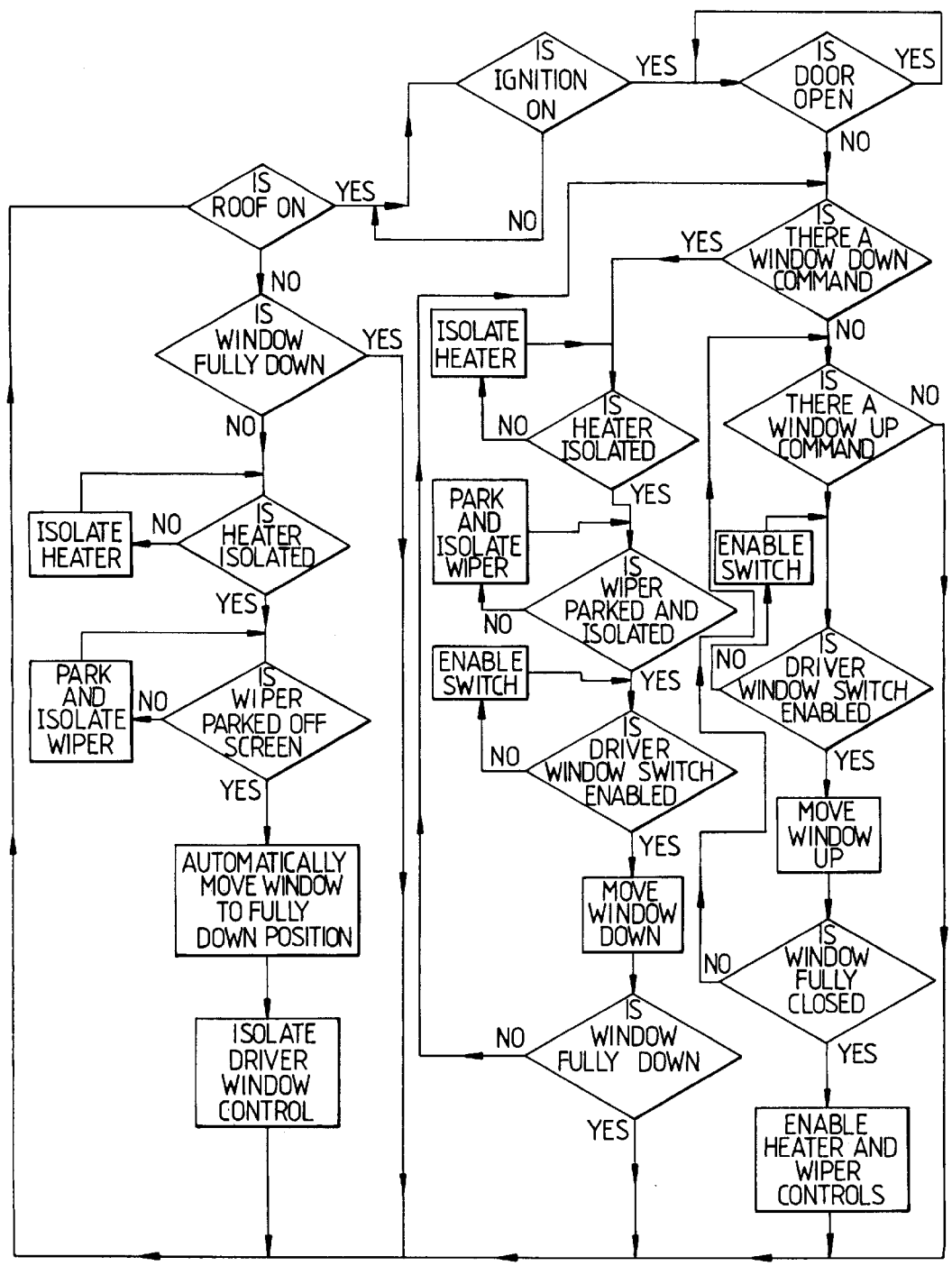
FIG. 5 is a simplified flow chart showing the major logical operations performed by the control circuit of FIG. 4.

Operation of the window assembly is best understood with reference to FIG. 5.

When the rear roof section 10 is in position on the rear body structure 9 the microswitch 26 sends a signal to the electronic controller 11 indicating that the roof section 10 is in place.

The electronic controller 11 monitors the output from the door sensor 17 to determine whether the rear door 39 is open or closed. If the signal from the door sensor 17 indicates that the door 39 is open then no further action occurs but if the door sensor 17 indicates that the door 39 is shut then the electronic controller 11 monitors the output from the driver operable window list switch to determine whether there is a demand for the window 23 to be moved up or down.

If there is a demand for the window 23 to be moved down the electronic controller 11 checks to see whether the screen heater 15 is isolated and that the wiper 27 is parked and if not places these devices into a safe condition before allowing the window 23 to be moved.

If the drivers window switch has been disabled then this is reconnected so that the window position can be controlled by the drivers switch. The position of the window 23 is continually monitored and as soon as it reaches the fully open position the power to the window lift motor 13 is automatically switched off by the electronic controller 11 to prevent overheating.

If there is a demand for the window 23 to be moved up the electronic controller 11 checks to see whether the drivers window switch has been disabled and if so this is reconnected so that the window position can be controlled by the drivers switch. The position of the window 23 is continually monitored and as soon as it reaches the fully up or closed position the power to the window lift motor 13 is automatically switched off by the electronic controller 11 to prevent overheating.

As soon as the output from the window position sensor 14 indicates that the window is in the fully up or closed position the electronic controller 11 enables the rear screen heater control unit 20 and the wiper motor control unit 19 so that, if required, the rear screen heater 15 and wiper 27 can be used under the direction of operator controlled switches (not shown). The operator controlled switches for the wiper 27 and the screen heater 15 are isolated while the window 23 is open to prevent misuse.

Although not shown on FIG. 5 when the door 39 is opened while the rear roof section 10 is fitted to the rear structure 9 of the vehicle the window 23 is prevented from being raised by the window lift motor 13 and automatically drops a small amount when the door is opened. The window cannot then be raised until the door 39 is shut.

When the rear roof section 10 is sensed by the microswitches 26 to be in place and the door 39 is shut the window lift motor control unit 12 is responsive to window position commands received from a driver operable window switch and will be moved to the required position as demanded by the operator controlled switch.

However before the window 23 can be moved from the fully closed position the electronic controller 11 always isolates the screen heater 15 and parks and isolates the wiper 27 before the window lift motor control unit 12 is activated by the electronic controller 11 to respond to signals received from the operator controlled switch. By performing this routine it is ensured that the window 23 cannot be moved to an open position without switching off the heater 15 and parking the wiper 27.

This is important because if the heater 15 is switched on while the screen 23 is retracted into the lower part of the door 39 damage to the seal 36 on the upper edge of the lower part of the door can occur. In addition, if the wiper 27 is to be moved to the fully open position the wiper 27 is moved to an off parked screen parked position so that the wiper 27 it does not interfere with the subsequent closing of the window 23.

When the detachable rear roof section 10 is removed from the rear body structure 9 of the motor vehicle the microswitches 26 associated with the roof securing means 25 send a signal to the electronic controller 11 indicating that the roof section 10 has been removed. If the window 23 is not already fully down the electronic controller 11 first isolates the screen heater 15 and off-screen parks the wiper 27 before sending a signal to the window lift controller 12 to fully open the window 23. After the window 23 is lowered to the fully open position the driver operable window switch is disabled so that even if a window move input is applied to the switch the window 23 will not move. This condition is retained so long as the roof 10 is removed so that the window 23 remains in the fully lowered position while the roof 10 is off.

Therefore whenever the roof section 10 is removed the window 23 is automatically retracted fully into the lower part of the door 39 thereby ensuring that the window 23 cannot be damaged.

Although the invention has thus far been described with respect to a motor vehicle having a removable rigid rear roof section it will be appreciated that it is equally applicable to a motor vehicle having a retractable rear roof section, such vehicles are often referred to as a cabriolet or a convertible.

In this case the root sensors 26 would be employed to sense whether the roof was erect and fastened in position.

When the roof is sensed to be not in an erect and fastened position the system will operate in the same manner as in the roof off situation discussed in detail above.

Similarly, when the roof is sensed to be erect and secured in place the control system will operate as discussed above with reference to the roof section being in place.

It will be appreciated by those skilled in the art that the invention is not limited to the use of microswitches to sense roof presence it is merely necessary to provide at least one sensor capable of sensing the presence or absence of the roof.

It will also be appreciated that the window lift mechanism shown and described herein is given as an example and there are numerous other window lift mechanisms that could be employed.

What is claimed is:

1. A motor vehicle having:
   a removable rear roof section;
   a roof sensor means to sense removal of the rear roof section;
   an upper door seal attached to the removable rear roof section;
   a number of doors including a rear door;
   the rear door having a lower part;
   a frameless rear window supported by the lower part of the rear door;
   the frameless rear window having an upper edge;
   an electric motor to move said rear window;
   an electronic controller to provide a control signal to control movement of the rear window between a closed position in which the upper edge of the rear window is engaged with the upper door seal attached to the removable rear roof section and an open position in which the rear window is fully retracted into the lower part of the rear door wherein when the rear roof section is removed the roof sensor means is operable to send a signal to the electronic controller to cause the electric motor to move the rear window to said open position.

2. A motor vehicle as claimed in claim 1 in which the roof sensor means is associated with a securing means used to secure the removable rear roof section in position.

3. A motor vehicle as claimed in claim 1 in which the window is maintained in said open position so long as the sensor means indicates that the rear roof section is not in position.

4. A motor vehicle as claimed in claim 2 in which the window is maintained in said open position so long as the sensor means indicates that the rear roof section is not in position.

5. A motor vehicle as claimed in claim 1 in which the rear door is fitted with a sensor to sense whether the rear door is open or closed and if the signal from the sensor indicates that the rear door is open the rear window is prevented from moving into a closed or up position.

6. A motor vehicle as claimed in claim 2 in which the rear door is fitted with a sensor to sense whether the rear door is open or closed and if the signal from the sensor indicates that the rear door is open the rear window is prevented from moving into a closed or up position.

7. A motor vehicle as claimed in claim 3, in which the rear door is fitted with a sensor to sense whether the rear door is open or closed and if the signal from the sensor indicates that the rear door is open the rear window is prevented from moving into a closed or up position.

8. A motor vehicle as claimed in claim 4 in which the rear door is fitted with a sensor to sense whether the rear door is open or closed and if the signal from the sensor indicates that the rear door is open the rear window is prevented from moving into a closed or up position.

9. A motor vehicle as claimed in claim 1 in which the frameless rear window is fitted with an electric screen heater which is isolated before the rear window is allowed to move into an open position.

10. A motor vehicle as claimed in claim 5 in which the frameless rear window is fitted with an electric screen heater which is isolated before the rear window is allowed into move into an open position.

11. A motor vehicle as claimed in claim 1 in which the rear window is fitted with a window wiper which is moved into a parked position before the rear window is allowed to move into an open position.

12. A motor vehicle as claimed in claim 5 in which the rear window is fitted with a window wiper which is moved into a parked position before the rear window is allowed to move into an open position.

13. A motor vehicle as claimed in claim 11 in which the wiper is parked off of the rear window before the rear window is allowed to move into a fully open position.

14. A motor vehicle as claimed in claim 12 in which the wiper is parked off of the rear window before the rear window is allowed to move into a fully open position.

15. A motor vehicle having:

a rear roof section;

at least one rear roof section securing means;

a roof sensor means to sense a presence of the rear roof section securing means;

an upper door seal attached to the rear roof section;

a number of doors including a rear door;

the rear door having a lower part;

a frameless rear window supported by the lower part of the rear door;

the frameless rear window having an upper edge;

an electric motor to move said rear window;

an electronic controller to provide a control signal to control movement of the rear window between a closed position in which the upper edge of the rear window is engaged with the upper door seal attached to the rear roof section and an open position in which the rear window is fully retracted into the lower part of the rear door wherein when the rear roof section securing means is not sensed the roof sensor means is operable to send a signal to the electronic controller to cause the electric motor to move the rear window to said open position.

16. A motor vehicle as claimed in claim 15 in which the roof sensor means is positioned adjacent the rear roof section securing means used to secure the rear room section in position.

17. A motor vehicle as claimed in claim 15 in which the window is maintained in said open position so long as the sensor means indicates that the rear roof section is not in position.

18. A motor vehicle as claimed in claim 16 in which the window is maintained in said open position so long as the sensor means indicates that the rear roof section securing means is not in position.

19. A motor vehicle as claimed in claim 15 in which the rear door is fitted with a sensor to sense whether the rear door is open or closed and if the signal from the sensor indicates that the rear door is open the rear window is prevented from moving into a closed or up position.

20. A motor vehicle as claimed in claim 16 in which the rear door is fitted with a sensor to sense whether the rear door is open or closed and if the signal from the sensor indicates that the rear door is open the rear window is prevented from moving into a closed or up position.

21. A motor vehicle as claimed in claim 17 in which the rear door is fitted with a sensor to sense whether the rear door is open or closed and if the signal from the sensor indicates that the rear door is open the rear window is prevented from moving into a closed or up position.

22. A motor vehicle as claimed in claim 18 in which the rear door is fitted with a sensor to sense whether the rear door is open or closed and if the signal from the sensor indicates that the rear door is open the rear window is prevented from moving into a closed or up position.

23. A motor vehicle as claimed in claim 15 in which the frameless rear window is fitted with an electric screen heater which is isolated before the rear window is allowed into move into an open position.

24. A motor vehicle as claimed in claim 19 in which the frameless rear window is fitted with an electric screen heater which is isolated before the rear window is allowed into move into an open position.

25. A motor vehicle as claimed in claim 15 in which the rear window is fitted with a window wiper which is moved into a parked position before the rear window is allowed to move into an open position.

26. A motor vehicle as claimed in claim 19 in which the rear window is fitted with a window wiper which is moved into a parked position before the rear window is allowed to move into an open position.

27. A motor vehicle as claimed in claim 25 in which the wiper is parked off of the rear window before the rear window is allowed to move into a fully open position.

28. A motor vehicle as claimed in claim 26 in which the wiper is parked off of the rear window before the rear window is allowed to move into a fully open position.

* * * * *